(12) United States Patent
Okada et al.

(10) Patent No.: US 9,251,926 B2
(45) Date of Patent: Feb. 2, 2016

(54) COLLECTIVE CONDUCTOR AND METHOD FOR PRODUCING COLLECTIVE CONDUCTOR

(71) Applicants: Ichiro Okada, Toyota (JP); Hiroaki Urano, Miyoshi (JP)

(72) Inventors: Ichiro Okada, Toyota (JP); Hiroaki Urano, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 14/018,797

(22) Filed: Sep. 5, 2013

(65) Prior Publication Data

US 2014/0096999 A1    Apr. 10, 2014

(30) Foreign Application Priority Data

Oct. 5, 2012   (JP) ................. 2012-223026

(51) Int. Cl.
*H01B 7/00*       (2006.01)
*H01B 5/00*       (2006.01)
*H01B 13/00*      (2006.01)
*H02K 3/04*       (2006.01)

(52) U.S. Cl.
CPC ............... *H01B 5/00* (2013.01); *H01B 13/00* (2013.01); *H02K 3/04* (2013.01)

(58) Field of Classification Search
CPC ............ H01B 7/00; H01B 13/00; H02K 3/04
USPC .................. 174/113 R, 117 FF; 310/45, 215
See application file for complete search history.

(56) References Cited

U.S. PATENT DOCUMENTS

| | | | | |
|---|---|---|---|---|
| 4,392,070 A | * | 7/1983 | Zdaniewski | 310/43 |
| 4,818,909 A | * | 4/1989 | Balke | 310/208 |
| 5,573,857 A | * | 11/1996 | Auger | 428/480 |
| 6,043,582 A | * | 3/2000 | Markovitz et al. | 310/213 |
| 6,870,292 B2 | * | 3/2005 | Owada et al. | 310/194 |
| 2004/0189134 A1 | * | 9/2004 | Onishi | 310/215 |
| 2010/0096185 A1 | | 4/2010 | Otsuka et al. | |
| 2012/0092117 A1 | | 4/2012 | Urano | |

FOREIGN PATENT DOCUMENTS

| | | |
|---|---|---|
| CN | 102668335 A | 9/2012 |
| JP | A-2007-227266 | 9/2007 |
| JP | A-2008-186724 | 8/2008 |
| JP | A-2009-070769 | 4/2009 |
| JP | A-2009-142059 | 6/2009 |
| JP | A-2010-177075 | 8/2010 |
| JP | A-2013-222536 | 10/2013 |

* cited by examiner

*Primary Examiner* — Chau N Nguyen
(74) *Attorney, Agent, or Firm* — Oliff PLC

(57) ABSTRACT

A collective conductor includes a plurality of conductive wires that is arranged collectively; and a copper foil that is wound around the collectively-arranged conductive wires and fusion-bonded to the conductive wires, and the copper foil has a tin plating on the side in contact with the conductive wires.

2 Claims, 2 Drawing Sheets

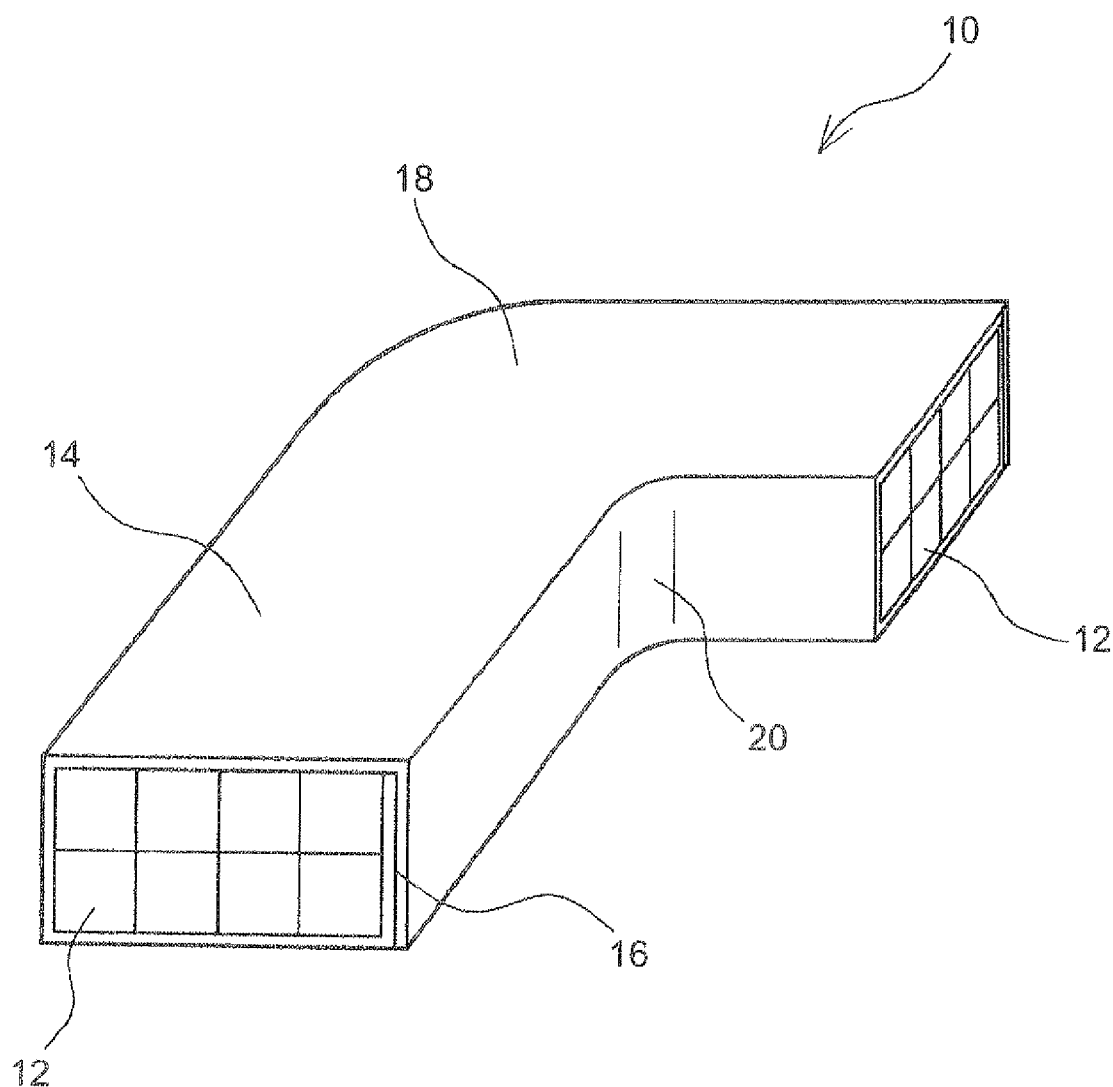

COLLECTIVE CONDUCTOR AND METHOD FOR PRODUCING COLLECTIVE CONDUCTOR

INCORPORATION BY REFERENCE

The disclosure of Japanese Patent Application No. 2012-223026 filed on Oct. 5, 2012 including the specification, drawings and abstract is incorporated herein by reference in its entirety.

BACKGROUND OF THE INVENTION

1. Field of the Invention

The present invention relates to a collective conductor and a method for producing the collective conductor. More specifically, the present invention relates to the structure of a collective conductor that is formed by tying a plurality of conductive wires together, and a method for producing the collective conductor.

2. Description of Related Art

A collective conductor that is formed by tying a plurality of conductive wires together has been proposed as a conductor for use in stator coils of a motor.

Japanese Patent Application Publication No. 2008-186724 (JP 2008-186724 A) discloses a collective conductor in which a plurality of conductive wires with a rectangular cross-section is collectively arranged parallel to one another. An adhesive is applied to the side faces of the conductive wires, and the conductive wires are bonded together via the adhesive. This prevents the conductive wires from separating from each other when the conductive wires are arranged collectively. In addition, an insulating film is provided as an outermost layer around the conductive wires and ties the collectively-arranged conductive wires together.

Some conventional collective conductors have a copper foil that is wound around the collectively-arranged conductive wires with a rectangular cross-section to tie the conductive wires together. When such a collective conductor is bent into the shape of a stator coil, there is a tendency toward a smaller bend radius because of the demand for smaller motor coil ends. Thus, there is a possibility that the copper foil on the inner periphery of the collective conductor may undergo buckling distortion under compressive stress. When the copper foil undergoes buckling distortion in this way, the bend section cannot be formed into an intended shape and may interfere with the adjacent coils.

SUMMARY OF THE INVENTION

The present invention provides a collective conductor which is formed by winding a copper foil around collectively-arranged conductive wires with a rectangular cross-section and in which the copper foil on the inner periphery of the collective conductor can be prevented from undergoing buckling distortion when the collective conductor is bent so that the eddy loss that is caused by a further decrease in the thickness of the copper foil can be reduced, and a method for producing the collective conductor.

A collective conductor according to a first aspect of the present invention includes a plurality of conductive wires that is arranged collectively; and a copper foil (14) that is wound around the collectively-arranged conductive wires and fusion-bonded to the conductive wires, and has a tin plating on the side in contact with the conductive wires. The conductive wires may have a rectangular cross-section in a direction perpendicular to the longitudinal direction of the conductive wires.

In the first aspect, the collective conductor may have a bend section that is formed by bending a portion of the collective conductor, and an overlapping portion where one end of the copper foil overlaps the other end of the copper foil may be located on the inner periphery side of the bend section. In the first aspect, the collective conductor may have a bend section that is formed by bending a portion of the collective conductor, and the copper foil on the inner periphery side of the bend section may be thicker than the copper foil on the outer periphery side of the bend section.

A method for producing a collective conductor according to a second aspect of the present invention includes collectively arranging a plurality of conductive wires; winding a copper foil with a tin plating around the arranged conductive wires such that the tin plating comes into contact with the conductive wires; and fusing the tin plating by heating to bond the copper foil to the conductive wires by the fused tin plating.

In the second aspect, the copper foil may be wound around the conductive wires such that both ends of the copper foil overlap each other, and the method may further included bending the collective conductor such that the seam where the ends of the copper foil overlap is located on the inner periphery side of the resulting bend.

In the second aspect, the conductive wires may be reshaped so that the conductive wires can have a rectangular cross-section in a direction perpendicular to the longitudinal direction of the conductive wires.

According to the collective conductor and the method for producing the collective conductor of the aspects of the present invention, the copper foil on the inner periphery of the collective conductor can be prevented from undergoing buckling distortion when the collective conductor is bent. As a result, the eddy loss can be reduced by further reducing the thickness of the copper foil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a diagram that illustrates the configuration of a collective conductor according to an embodiment.

DETAILED DESCRIPTION OF EMBODIMENTS

Figure 2A:
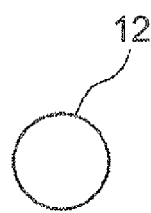
FIG. 2A, FIG. 2B, FIG. 2C and FIG. 2D are diagrams that illustrate the process of producing the collective conductor according to the embodiment.

Description is hereinafter made of an embodiment of a collective conductor according to the present invention and a method for producing the collective conductor with reference to the drawings. The collective conductor according to this embodiment is first described with reference to FIG. 1. FIG. 1 is a diagram that illustrates the configuration of a collective conductor according to an embodiment.

A collective conductor 10 has a plurality of conductive wires 12 with a rectangular cross-section, and a copper foil 14 that is wound around the conductive wires 12 to tie the conductive wires 12 together.

The conductive wires 12 are made of an electrically conductive material, such as copper. The outer surfaces of the conductive wires 12 are coated with a copper oxide film. The copper oxide film is formed by keeping the conductive wires 12 in air at a certain temperature for a certain period of time. It should be noted that the present invention is not limited to this configuration, and the film may be made of a different material, such as a resin, as long as the material of the film has a higher electrical resistance than the material of the conductive wires 12.

As shown in FIG. 1, eight conductive wires 12 are collectively arranged in two rows and four columns and extend parallel to one another. The number, eight, of the conductive wires 12, and the numbers, two and four, of the rows and columns are merely examples. The present invention is not limited to these numbers, and a plurality of conductive wires 12 may or may not be arranged parallel to one another.

The copper foil 14 is wound around the collectively-arranged conductive wires 12 with one end overlapping the other. The seam where both ends of the copper foil 14 overlap, which is formed when the copper foil 14 is wound, is hereinafter referred to as "overlapping portion 16." The overlapping portion 16 is formed along the direction in which the collective conductor 10 extends.

The copper foil 14 ties the collectively-arranged conductive wires 12 together and prevents the conductive wires 12 from separating from each other. Also, the copper foil 14 functions as a conductor and also allows electricity to flow through it when the collective conductor 10 is used as a stator coil (not shown) of a motor. The copper foil 14 has a thickness of 0.1 mm, for example. However, the present invention is not limited to this configuration, and the copper foil may be thinner as long as the copper foil can be prevented from undergoing buckling distortion as described later so that the eddy loss can be reduced when the collective conductor 10 is used as a stator coil.

The collective conductor 10 has a bend section 18 that is formed by bending a portion of the collective conductor 10 into the shape of a stator coil. When the collective conductor 10 is bent, compressive stress is generated on the inner periphery side 20 of the bend section 18 (inside of the bend radius). As described in the description of related arts, when the copper foil undergoes buckling distortion under the compressive stress, the collective conductor 10 may not be able to maintain its rectangular cross-section and may interfere with adjacent coils.

In the collective conductor 10 of this embodiment, a tin-plated copper foil, a copper foil with a tin plating on one side, is used as the copper foil 14. The copper foil 14 is wound around the conductive wires 12 with the tin-plated side facing the conductive wires 12. Then, the tin plating is fused to fusion-bond the copper foil 14 to the conductive wires 12. This is a characteristic feature of the collective conductor 10.

With this configuration, the copper foil 14 is fusion-bonded to and integrated with the conductive wires 12, reinforcing the rigidity of the copper foil 14. Thus, the copper foil 14 is prevented from undergoing buckling distortion under compressive stress generated on the inner periphery side 20 of the bend section 18 when the collective conductor 10 is bent. When there is no possibility of the copper foil 14 undergoing buckling distortion, the collective conductor 10 can be formed into a desired bent shape, eliminating the possibility of adjacent stator coils interfering with each other.

In the collective conductor 10 of this embodiment, the overlapping portion 16 is formed to be located on the inner periphery side 20 of the bend section 18. With this configuration, the copper foil 14 is thicker on the inner periphery side 20 of the bend section 18 than at any other portion, and the rigidity of the copper foil 14 in this region is higher than that in any other region. Thus, the copper foil 14 on the inner periphery side 20 of the bend section 18 is prevented from undergoing buckling distortion under compressive stress that is generated when the collective conductor 10 is bent. The overlapping portion 16 is preferably formed over the entire area on the inner periphery side 20 so that the overlapping portion 16 can bear the compressive stress that is generated on the inner periphery side 20 of the bend section 18.

Figure 2B:
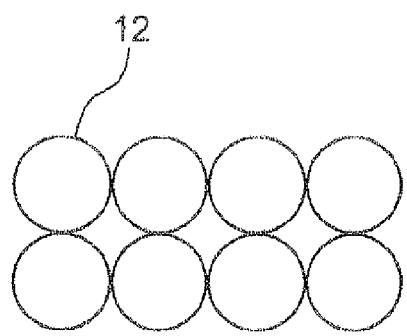

A method for producing the collective conductor 10 of this embodiment is described with reference to FIG. 2A to FIG. 2D. As shown in FIG. 2A, conductive wires 12 with a circular cross-section are prepared. When the conductive wires 12 are kept in air at a certain temperature for a certain period of time, a copper oxide film is formed on the outer surfaces of the conductive wires 12. Then, as shown in FIG. 2B, eight conductive wires 12 are collectively arranged parallel to one another in two rows of four each, or in a circle as seen in an axial direction of the conductive wires.

Figure 2C:
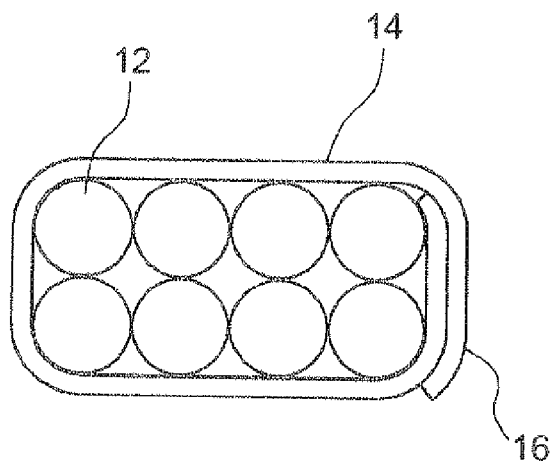

As shown in FIG. 2C, the copper foil 14 is wound around the collectively-arranged conductive wires 12. At this time, the copper foil 14 is wound such that the tin plating of the copper foil 14 comes into contact with the conductive wires 12. Also, the copper foil 14 is wound such that the overlapping portion 16 is located on the inner periphery side 20 of the bend section 18, which will be formed later when the collective conductor 10 is bent.

Figure 2D:
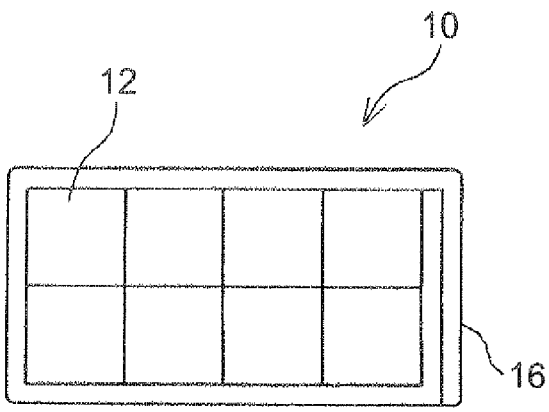

After the copper foil 14 is wound, the conductive wires 12 are reshaped from a circular cross-section into a rectangular cross-section by, for example, passing the conductive wires 12 together through a die that has an opening with a rectangular cross-section. Then, after the conductive wires 12 are reshaped into a rectangular cross-section, the conductive wires 12 are heated to a temperature higher than the melting point of tin, 239° C., such as 240° C., to fuse the tin plating on the copper foil 14 in order to fusion-bond the copper foil 14 to the conductive wires 12 as shown in FIG. 2D. At this time, both ends of the copper foil 14 are fusion-bonded to form the overlapping portion 16. By this process, a linear collective conductor 10 in which the collectively-arranged conductive wires 12 are tied together and prevented from separating from each other by the copper foil 14 is produced.

To form the linear collective conductor 10 into the shape of a stator coil, a bending jig (not shown) is used to bend the collective conductor 10 to form the bend section 18. At this time, the strength against buckling distortion of the copper foil 14 on the inner periphery side 20 of the bend section 18 has increased because the copper foil 14 has been integrated with the adjacent conductive wires 12 and the overlapping portion 16, which is twice as thick as any other portion, has been formed as a result of the previous process. With this configuration, even if compressive stress is generated on the inner periphery side 20 when the collective conductor 10 is bent, the copper foil 14 is prevented from undergoing buckling distortion under the stress. Thus, because the copper foil 14 can maintain its designed cross-sectional shape on the inner periphery side 20 of the bend section 18, the stator coil can be assembled to the core without fear of interference with other stator coils.

After that, a resin layer is formed by electrodeposition on the surfaces of the collective conductor 10, which has been shaped into a stator coil. The resin layer not only has insulating performance but also reduces the friction coefficient of the surfaces of the collective conductor 10 and makes it easier to insert the stator into a slot. While a case where the collective conductor 10 is subjected to electrodeposition coating is described in this embodiment, the present invention is not limited to this configuration. The coating may be formed by a dipping, painting or deposition process as long as the coating has insulating performance.

While a case where conductive wires 12 with a circular cross-section are first arranged correctively is described in the method for producing a collective conductor 10 of this embodiment, the present invention is not limited to this process. Conductive wires 12 that have been formed into a rectangular cross-sectional shape in advance may be collectively arranged.

What is claimed is:

1. A collective conductor comprising:
   a plurality of conductive wires, having a rectangular cross-section, arranged collectively; and
   a copper foil wound around the collectively-arranged conductive wires and integrated with the conductive wires, wherein:
   the copper foil has a tin plating on the side in contact with the conductive wires,
   the copper foil adheres to the conductive wires by fusing the tin plating,
   the conductive wires have a rectangular cross-section in a direction perpendicular to the longitudinal direction of the conductive wires, and
   the collective conductor has a bend section that is formed when the collective conductor is bent into a shape of a stator coil, and an overlapping portion where one end of the copper foil overlaps the other end of the copper foil, the overlapping portion being located on the inner periphery side of the bend section.

2. A collective conductor comprising:
   a plurality of conductive wires, having a rectangular cross-section, arranged collectively; and
   a copper foil wound around the collectively-arranged conductive wires and integrated with the conductive wires, wherein:
   the copper foil has a tin plating on the side in contact with the conductive wires, the copper foil adheres to the conductive wires by fusing the tin plating,
   the conductive wires have a rectangular cross-section in a direction perpendicular to the longitudinal direction of the conductive wires, and
   the collective conductor has a bend section, and the copper foil on the inner periphery side of the bend section is thicker than the copper foil on the outer periphery side of the bend section.

* * * * *